United States Patent [19]

Kato et al.

[11] 4,366,123

[45] Dec. 28, 1982

[54] ANCHOR AGITATOR FOR GASEOUS PHASE POLYMERIZATION VESSEL

[75] Inventors: Akifumi Kato, Ohtake; Nobuhiko Kaneshige, Iwakuni; Ryoichi Yamamoto, Waki, all of Japan

[73] Assignee: Mitsui Petrochemical Industries Ltd., Tokyo, Japan

[21] Appl. No.: 304,081

[22] Filed: Sep. 21, 1981

[51] Int. Cl.$^3$ .......................... B01F 7/18; B01J 12/02; B01J 8/10

[52] U.S. Cl. .................................... 422/135; 366/279; 422/225; 422/235; 422/139

[58] Field of Search ............... 422/131, 135, 225, 226, 422/310, 235; 366/279, 309, 312, 314, 325, 329

[56] References Cited

U.S. PATENT DOCUMENTS

| | | | |
|---|---|---|---|
| 3,545,729 | 12/1970 | Wisseroth et al. | 366/314 |
| 3,730,486 | 5/1973 | Hayashi et al. | 366/316 |
| 3,738,974 | 6/1973 | Takehisa et al. | 422/138 |
| 3,877,881 | 4/1975 | Ono et al. | 422/135 |

*Primary Examiner*—Michael S. Marcus
*Attorney, Agent, or Firm*—Sherman & Shalloway

[57] ABSTRACT

An improved anchor agitator is provided for performing uniform and effective stirring of the fluidized bed zone of a polymerization vessel in a gaseous phase polymerization, especially of olefins such as ethylene and propylene. The anchor agitator includes at least two pairs of arms provided on a rotating shaft in mutually crossing positions. A pair of main blades is provided at opposite outward end portions of one pair of arms and at the opposite outward portions of each remaining pair of arms a pair of subsidiary blades is provided. The main blades and subsidiary blades extend substantially parallel along the axis of the rotating shaft and each pair of blades is located substantially equidistant from the axis of the rotating shaft. The pair of main blades is located farther from the axis of the rotating shaft than the subsidiary blades. The main blades and subsidiary blades are uniquely designed to avoid the formation of coherent crusts or lumps near the inner wall of the polymerization vessel and to avoid formation of a vortex formed centrally in the fluidized bed zone of the vessel in the vertical direction of the zone. The unique angular relationships and distance relationships of the main blades and subsidiary blades also avoid the likelihood of vibration due to mechanical imbalance of the agitator while at the same time allowing the agitator to be easily designed and built.

3 Claims, 5 Drawing Figures

ANCHOR AGITATOR FOR GASEOUS PHASE POLYMERIZATION VESSEL

This invention relates to an anchor agitator for a gaseous phase polymerization vessel, which is provided in a fluidized bed zone of a polymerization vessel in the gaseous phase polymerization of olefins such as ethylene and propylene and is suitable for performing uniform and effective stirring of the fluidized bed zone. According to the anchor agitator of the invention, it is possible to avoid the formation of coherent crusts or lumps near the inner wall of the polymerization vessel, and the formation of agglomerated masses or lumps of a polymer owing to a vortex formed centrally in a fluidized bed zone of the vessel in the vertical direction of the zone, i.e. in the direction of its depth. Furthermore, there is no likelihood of vibration owing to the mechanical imbalance of the agitator, and the agitator can be easily designed and built.

In the gaseous phase polymerization of olefins, it is desired to mix solid particles of the resulting pulverulent polymer and catalyst particles uniformly and sufficiently with gaseous olefin monomers and, in some cases, also with an easily volatile hydrocarbon or a liquid olefin by using an agitator which can impart a uniform and effective agitating action to the fluidized bed zone of a polymerization vessel. However, no industrially satisfactory means for uniform and effective mixing has been provided to date.

In addition to the anchor agitator, a paddle type agitator comprising a plurality of agitating blades spaced at suitable intervals along a rotating shaft, and a screw agitator for circulating the fluidized bed zone in a vertical flow pattern have also been known heretofore for use in a gaseous phase polymerization vessel. These conventional agitators, however, have some drawbacks when used in a gaseous phase polymerization vessel.

The most common type of the anchor agitator comprises a pair of arms secured to a rotating shaft at right angles thereto and agitating blades extending substantially parallel along the axis of the rotating shaft and provided at opposite outward end portions of the arms located substantially equidistant from the shaft. With this type of anchor agitator, a powdery polymer undergoes a centrifugal action by the rotation of the agitator and gathers on, and adheres to, the inner wall surface of the polymerization vessel to form coherent crusts or lumps. In addition, a vortex is formed at the central part of the fluidized bed zone in the perpendicular direction of the zone, that is, in the direction of its depth. A monomer gas introduced from the bottom of the zone flows deviatingly into this part to form agglomerated masses or lumps of the polymer. Investigations of the present inventors have shown that the deviating flow of the monomer gas to the central part of the fluidized bed zone cannot be blocked even by providing two additional stirring blades in those parts of the arms which are nearer to the rotating shaft.

The paddle-type agitator, on the other hand, does not cause the trouble of vortex formation in a gaseous phase polymerization vessel, but has the defect that the flowability of the polymer near the inner wall surface of the polymerization vessel is poor, and the polymer strongly tends to adhere and agglomerate near the wall surface of the vessel to form coherent crusts or lumps.

With the screw agitator, a deviated flow of the polymer occurs in the downward portion of the fluidized bed because the fluidized bed makes a circulating motion up and down. Accordingly the powdery polymer changes into agglomerated masses or lumps in the above portion of the fluidized bed, and the agitator is unsuitable for long-term continuous operation on an industrial scale.

As a modified anchor agitator provided in an attempt to remove the trouble of formation of coherent crusts or lumps in a gaseous phase polymerization vessel, U.S. Pat. No. 3,545,729 discloses an anchor agitator having two arms for use in a stirring vessel, said arms being rotatable about the center line of said vessel, wherein the arms are disposed parallel to the center line of the vessel at different distances from the center line, the outer arm being longer and closer to the bottom of the vessel than the inner arm and both arms having a streamlined cross section externally defined by arcs of a circle or of a logarithmic spiral.

Investigations of the present inventors have shown that when the rotating speed of the anchor disclosed in the above-cited U.S. patent is increased in order to give a sufficient agitating effect, vibration occurs in the agitator, presumably because of an imbalance in mechanism owing to the different arm lengths and the different arm mounting positions on the rotating shaft. Furthermore, it has been found that since the rising part of the arms, that is the cross sectional shape of the stirring blades, is complex, the agitator is complex and costly to design and build. Another defect the inventors have found is that the trouble of vortex formation in the anchor agitator cannot virtually be avoided in practice.

The present inventors have undertaken extensive investigations in order to provide an anchor agitator for gaseous phase polymerization which is free from the aforesaid defects and can exhibit an exceptionally good agitating performance in gaseous phase polymerization.

These investigations have led to the discovery that an anchor agitator for a gaseous phase polymerization vessel, comprising a rotating shaft, at least two pairs of arms provided on the rotating shaft in mutually crossing positions, and agitating blades provided at opposite outward end portions of each pair of arms, said blades extending substantially parallel along the axis of the rotating shaft and being located substantially equidistant from the axis of the rotating shaft in each pair of arms, which anchor agitator have the structural features (I), (II) and (III) given below, can achieve a uniform and effective stirring of a fluidized bed in a gaseous phase polymerization vessel while preventing formation of coherent crusts or lumps, a vortex, and agglomerated masses or lumps due to the vortex and the occurrence of vibration.

(I) Of said at least two pairs of blades, one pair of blades is a pair of main blades located farther from the axis of the rotating shaft than the remaining at least one pair of blades, and said remaining blades are subsidiary blades located nearer to the axis of the rotating shaft.

(II) Each of the main blades meets the following requirements.

(II-1) its horizontal section crossing at right angles to the axis of the rotating shaft is of a triangular shape, and in rotation, the interior angle $\alpha$ of the vertex A forming the forward end of the triangle in the advancing direction is defined by $10° \leq \alpha \leq 45°$;

(II-2) the internal angle $\beta$ of the vertex B of the triangle which is farther from the axis of the rotating shaft of the two vertexes B and C in the rearward portion of the triangle in the advancing direction is defined by $80° \leq \beta \leq 150°$;

(II-3) the shortest distance $r_1$ between the vertex A and the axis of the rotating shaft and the shortest distance $r_2$ between the vertex B and the axis of the rotating shaft satisfy the relation $0.8r_1 \leq r_2 < r_1$; and (II-4) the distance l between the vertex A and the vertex C and the distance $r_1$ satisfy the relation $0.1r_1 \leq l \leq 0.5r_1$;

(III) Each of the subsidiary blades meets the following requirements.

(III-1) the shortest distance $r_3$ between the axis of the rotating shaft and that site of each subsidiary blade which is farthest from the axis of the shaft and the distance $r_1$ satisfy the relation $0.2r_1 \leq r_3 \leq 0.8r_1$; and (III-2) each of the subsidiary blades is located within a range of $\pm 60°$ with respect to a straight line perpendicularly crossing the straight line which passes through the centers of the triangles of the main blades in the horizontal section.

It is an object of this invention therefore to provide an improved anchor agitator for a gaseous phase polymerization vessel.

The above and other objects and advantages of the invention will become apparent from the following description.

The anchor agitator of the invention is described in detail below with reference to the accompanying drawings in which.

Figure 1:
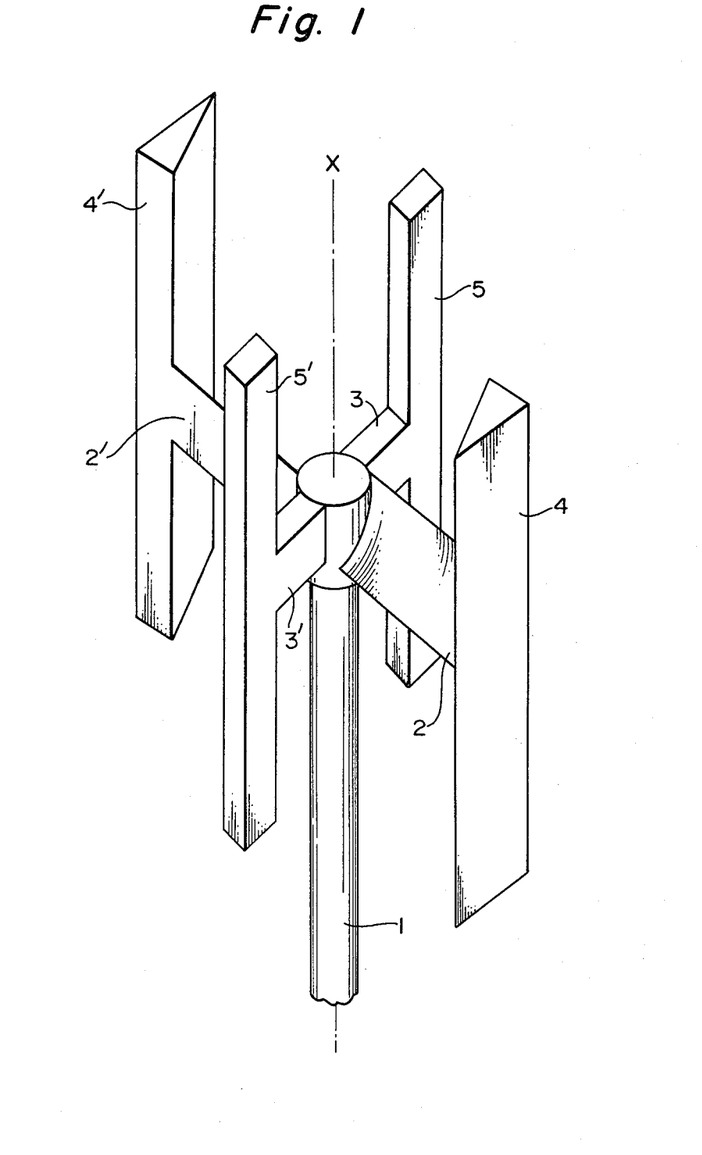
FIG. 1 is a perspective view of one embodiment of the anchor agitator of the invention (with a part of the rotating shaft being omitted)
Figure 2:
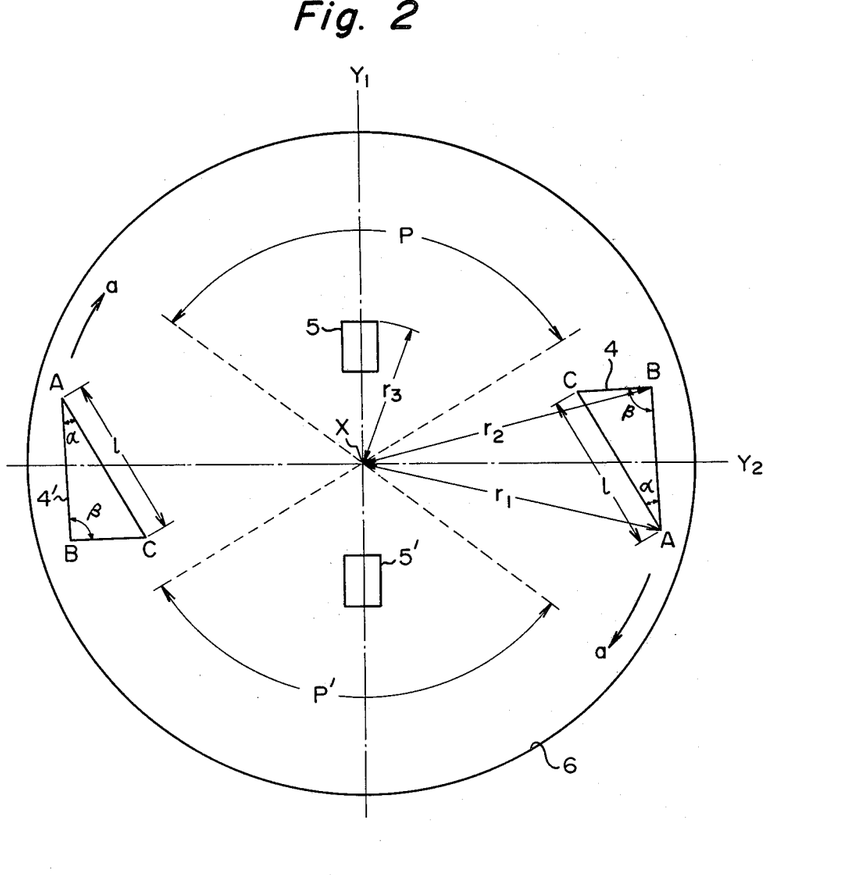
FIG. 2 is a horizontal sectional view taken at right angles to the axis of the rotating shaft of the anchor agitator shown in FIG. 1 with the two pairs of arms and the rotating shaft being omitted.

Referring to FIGS. 1 and 2, two pairs of arms 2,2' and 3,3' are provided on a rotating shaft 1 of the agitator at mutually crossing positions. Agitating blades 4,4' and 5,5' are provided at outward end portions of the arms 2,2' and 3,3'. The agitating blades extend substantially parallel along the axis X of the rotating shaft 1, and in each pair of the arms, the blades are located substantially equidistant from the axis X of the rotating shaft 1.

In the anchor agitator of the above structure, one pair of blades 4,4' is a pair of main blades which are located farther from the axis X than the other pair of blades 5,5', and the other pair of blades 5,5' are subsidiary blades [requirement (I)]. If, contrary to the above requirement (I), the main blades 4,4' are located near the axis X, and the subsidiary blades 5,5' are located farther away, a vortex will be formed at the central part of the fluidized bed zone, and agglomerated masses or lumps will be formed at this part.

It is essential that the main blades should meet the requirements (II-1) to (II-4) described below.

(II-1) The horizontal section of each main blade crossing the axis X at right angles thereto is substantially of a triangular shape as shown in FIG. 2, and in rotation, the interior angle $\alpha$ of the vertex A forming the forward end of the triangle in the advancing direction, i.e. the vertex A forming the forward end in the advancing direction of the triangle ABC in FIG. 2 when the blade rotates in the direction of arrows along the inside wall 6 of the polymerization vessel, is defined by $10° \leq \alpha \leq 45°$. If the interior angle $\alpha$ is less than 10°, the ability of the blades 4,4' to scrape a powdery polymer into the central part of the polymerization vessel is reduced. If the angle $\alpha$ is larger than 45°, the powdery polymer is pushed toward the inner wall 6 of the polymerization vessel, and coherent crusts or lumps of the polymer tend to form. The angle $\alpha$ is therefore set at $10° \leq \alpha \leq 45°$, preferably $20° \leq \alpha \leq 40°$.

(II-2) The interior angle $\beta$ of the vertex B which is farther from the axis X than the two vertex C in the rearward portion of the triangle in the advancing direction is defined by $80° \leq \beta \leq 150°$. A a result of designing the main blades in this way, a suitable turbuent flow zone having a reduced pressure is formed rearwardly of the blades 4,4' (in the vicinity of the side BC of the triangle ABC in FIG. 2), which, however, is not the case with the agitator disclosed in the above-cited U.S. Pat. No. 3,545,729. As a result, in conjunction with the action of the subsidiary blades 5,5', the main blades 4,4' serve to eliminate the trouble of vortex formation at the central part of the fluidized bed zone which is attributed to the deviating flow of gas toward the central portion of the agitator. The preferred interior angle $\beta$ is $85° \leq \beta \leq 135°$.

(II-3) In each of the main blades 4 and 4', the shortest distance $r_1$ between the vertex A and the axis X and the shortest distance $r_2$ between the vertex B and the axis X satisfy the relation $0.8r_1 \leq r_2 \leq r_1$. If $r_2$ is equal to, or larger than, $r_1$, the powdery polymer tends to be readily pushed densely into the space between the inner wall 6 and the blades, and formation of polymer coherent crusts or lumps is facilitated. If $r_2$ is smaller than $0.8 r_1$, the powdery polymer tends to stagnate in the vicinity of the inner wall 6, and the reaction conditions at this portion differ from those at the central portion of the polymerization vessel. Consequently, the quality of the resulting polymer is likely to vary.

(II-4) In each of the main blades 4 and 4', the distance l between the vertex A and the vertex C and the distance $r_1$ satisfy the relation $0.1r_1 \leq l \leq 0.5r_1$. If l is smaller than $0.1r_1$, the ability of the blades 4 and 4' to convey the powdery polymer toward the central portion of the fluidized bed zone is reduced, and a vortex is likely to form at the central portion of the fluidized bed. Accordingly, the main blades should be designed to meet the above conditions. If the distance exceeds $0.5 r_1$ the space occupied by the blades becomes excessive, and the power consumption for operating the agitator increases disadvantageously.

In addition to the above requirements (II-1) to (II-4), of the main blades, the subsidiary blades 5,5' must meet the requirement (III) consisting of (III-1) and (III-2).

(III-1) The shortest distance $r_3$ between the axis X of the rotating shaft 1 and that site of each of the subsidiary blades 5 and 5' which is farthest from the axis X and the distance $r_1$ should satisfy the relation $0.2r_1 \leq r_3 \leq 0.8r_1$. If $r_3$ is less than $0.2 r_1$ or exceeds $0.8 r_1$, a vortex is formed in the interface at the central portion of the fluidized bed zone, and a deviated flow of the gas toward the central portion is generated.

(II-2) Each of the subsidiary blades 5 and 5' is located within a range of ±60° with respect to a straight line $Y_1$ perpendicularly crossing the straight line $Y_2$ which passes through the centers of the triangles of the main blades in the horizontal section (the straight line $Y_2$ is the line formed by connecting the center points of the sides AC of the main blades 4 and 4'). The range is shown by P and P' in FIG. 2.

If the positions of the subsidiary blades 5 and 5' come too close to the main blades 4 and 4' beyond the above-specified ranges, formation of a vortex at the central portion of the fluidized bed zone is further facilitated to form large amounts of agglomerated masses or lumps of the polymer.

The lengths of the main blades 4 and 4' and the subsidiary blades 5 and 5' can be changed as desired in the anchor agitator of the invention. Preferably, the blades are designed such that their lengths correspond to about 30 to about 120%, especially about 60 to about 100%, of the height of the fluidized bed zone in the gaseous phase polymerization vessel.

In providing the anchor agitator of the invention in a gaseous phase polymerization vessel, they are preferably positioned such that the vertexes A and B of the main blades have a clearance of about 0.003 D to about 0.2 D, where D is the diameter of the polymerization vessel, from the inside surface 6 of the polymerization vessel.

Figure 3:
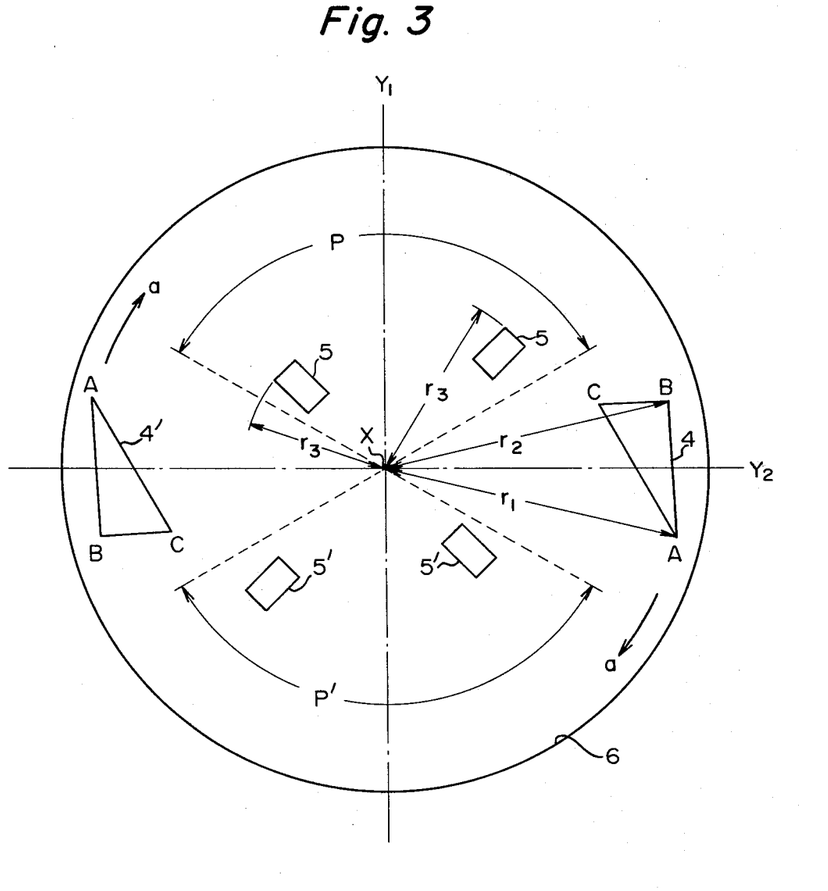
FIG. 3 is a horizontal sectional view, similar to FIG. 2, of another embodiment of the anchor agitator of the invention.
Figure 4:
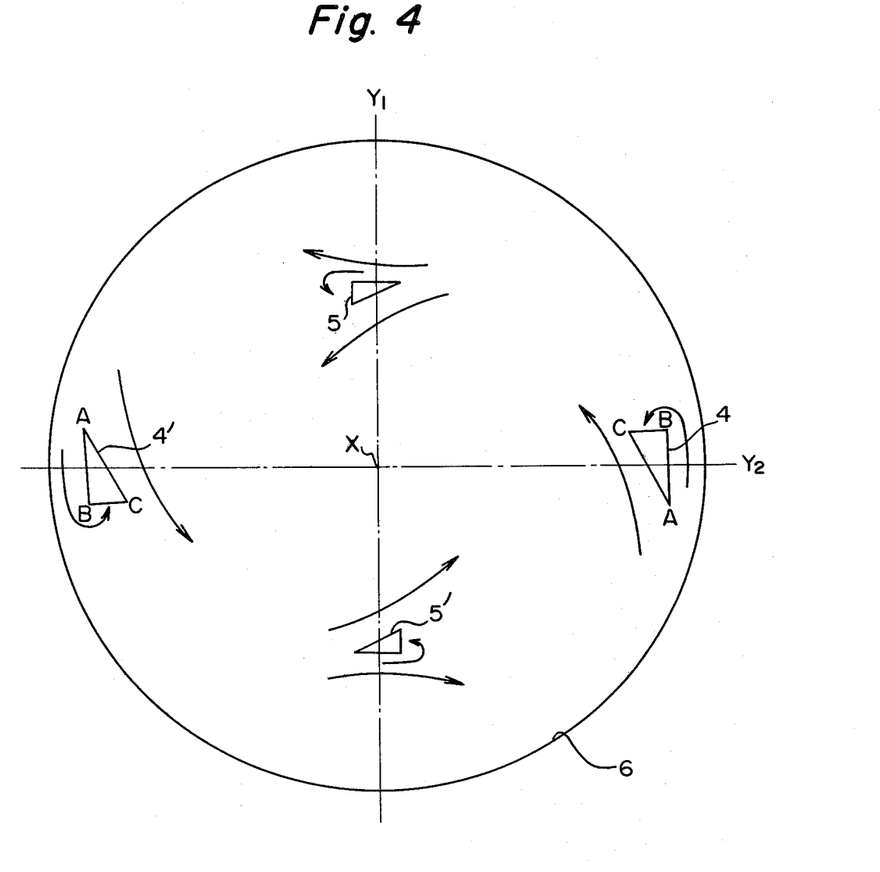
FIG. 4 is a horizontal sectional view, similar to FIG. 2, showing an example of the sectional shape of subsidiary blades.

If desired, two or more pairs of subsidiary blades may be provided as shown in FIG. 3. The sectional shape of the subsidiary blades can be changed as desired, and may be triangular as shown in FIG. 4. In FIG. 4, the patterns of the agitated flows are shown by arrows.

Below are shown an example in which propylene was polymerized using a gaseous phase polymerization vessel having the anchor agitator of the invention, and a comparative example in which the polymerization of propylene was effected by using a comparative agitator not including the subsidiary blades.

Experimental Apparatus

Figure 5:
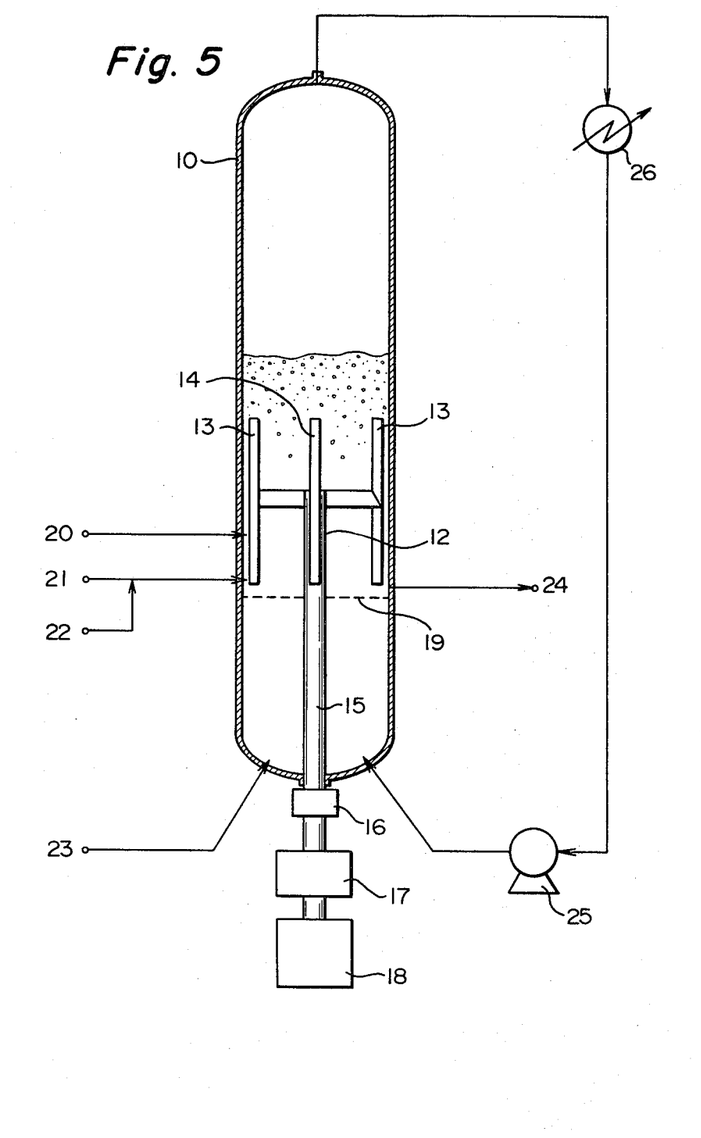
FIG. 5 is a view of an experimental polymerization apparatus equipped with the anchor agitator of the invention, which was used in the working example given hereinbelow.

An apparatus of the type illustrated in FIG. 5 was used. An anchor agitator 12 equipped with main blades 13 and subsidiary blades 14 was set in a reactor 10. The anchor agitator 12 was secured to a rotating shaft 15 for rotation via a reduction gear 17 by a motor 18. To prevent gas leakage, a shaft seal 16 was provided in the rotating shaft 15. A gas sparger plate 19 was provided at a position 400 mm from the bottom of the reactor, and the clearance between the gas sparger plate 19 and the lower end portion of the blades 13 and 14 was adjusted to 20 mm.

Specification of the reactor:
Total height: 1500 mm
Inside diameter: 300 mm
Mounting position of the gas sparger plate: 400 mm above the bottom of the reactor
Material: SUS 304 stainless steel
Specification of the agitator:
(Main blades)
Sectional shape: triangle
Interior angle α: 30°
Interior angle β: 90°
Distance $r_1$: 135 mm
Distance $r_2$: 130 mm
Distance l: 45 mm
(Subsidiary blades)
Farthest position ($r_3$): 70 mm
Near position: 40 mm
Width: 20 mm
With respect to the straight line connecting the centers of the main blades: crossing at right angles
(Lengths of the main and subsidiary blades): 460 mm
(Diameter of the rotating shaft): 40 mm Synthesis of a catalyst:

A 200 ml flask was charged with 7.2 g of anhydrous $MgCl_2$, 23 ml of decane and 23 ml of 2-ethylhexanol, and they were reacted at 120° C. for 2 hours to form a uniform solution. Then, 1.68 ml of ethyl benzoate was added.

To a 400 ml flask was added 200 ml of $TiCl_4$, and all of the uniform solution obtained as above which was cooled at −20° C. was added dropwise over 1 hour, and then the mixture was heated to 80° C. It was stirred at 80° C. for 2 hours. The solid portion was collected by filtration, and suspended in 200 ml of a fresh supply to $TiCl_4$. The mixture was stirred at 90° C. for 2 hours. After the stirring, the solid portion was collected by hot filtration, and washed thoroughly with hot kerosene and hexane to give a titanium catalyst component which contained 4.5% by weight of Ti, 60% by weight of Cl and 18% by weight of Mg and had an average particle diameter of 15 microns and a specific surface area of 195 $m^2/g$.

Pre-treatment of the catalyst:

The resulting catalyst slurry was again suspended in hexane so that its concentration was 5 mmoles/liter as Ti atom. Triethyl aluminum was added so that its concentration reached 15 mmoles/liter. Furthermore, propylene was fed in a proportion of 0.5 g per gram of the titanium catalyst component and the treatment of the catalyst was performed at 40° C.

Polymerization:

In the experimental apparatus shown in FIG. 5, polypropylene powder having an average particle diameter of 450 microns was filled to a height of 450 mm from the gas sparger plate 19. Propylene gas was fed into the apparatus through an opening 23, and circulated by operating a circulating blower 25.

The titanium catalyst slurry whose concentration was readjusted to 1.0 mmoles/liter of hexane was fed from an opening 20 at a rate of 1 liter/hr, and triethyl aluminum was fed through an opening 21 at a rate of 25 mmoles/hr. Furthermore, as a third component, methyl p-toluate was fed through an opening 22 at a rate of 8.5 mmoles/hr.

Propylene was fed from the opening 23 at a rate of 5 kg/hr, and hydrogen was also fed therefrom at a rate of 0.04 mole per mole of propylene. The reaction temperature was set at 80° C. by using a cooler 26. The reaction pressure was set at 9.8 $kg/cm^2.G$. The rotating speed of the stirring blades was 150 rpm. The superficial velocity in a column of the gases was 10 cm/sec.

The resulting polymer was withdrawn from an opening 24 so that the amount of the propylene polymer in the polymerization vessel was substantially constant. There was obtained a propylene polymer having an isotacticity index of 94.5%, a melt flow index of 8.5, a bulk density of 400 $kg/m^3$ and an average particle diameter of 450 microns.

When the polymerization was performed continuously for 70 hours, no trouble attributed to the formation of polymer masses or the adhesion of the polymer to the reactor wall occurred.

For comparison, the above procedure was repeated except that the anchor agitator did not contain the subsidiary blades.

In 20 hours from the start of the reaction, the driving power for driving the motor for the agitator increased to 3 KW from 2 KW. Hence, the reaction was stopped and the inside of the apparatus was inspected. A polymer mass having a diameter of about 200 mm was seen to form at the lower portion of the fluidized bed zone.

What we claim is:

1. In an anchor agitator for a gaseous phase polymerization vessel, comprising a rotating shaft, at least two pairs of arms provided on the rotating shaft in mutually crossing positions, and agitating blades provided at opposite outward end portions of each pair of arms, said blades extending substantially parallel along the axis of the rotating shaft and being located substantially equidistant from the axis of the rotating shaft in each pair of arms, the improvement wherein (I) of said at least two pairs of blades, one pair of blades is a pair of main blades located farther from the axis of the rotating shaft than the remaining at least one pair of blades, and said remaining blades are subsidiary blades located nearer to the axis of the rotating shaft, (II) each of the main blades meets the following requirements:

(II-2) its horizontal section crossing at right angles to the axis of the rotating shaft is of a triangular shape, and in rotation, the interior angle $\alpha$ of the vertex A forming the forward end of the triangle in the advancing direction is defined by $10° \leq \alpha \leq 45°$;

(II-2) the internal angle $\beta$ of the vertex B of the triangle which is farther from the axis of the rotating shaft of the two vertexes B and C in the rearward portion of the triangle in the advancing direction is defined by $80° \leq \beta \leq 150°$;

(II-3) the shortest distance $r_1$ between the vertex A and the axis of the rotating shaft and the shortest distance $r_2$ between the vertex B and the axis of the rotating shaft satisfy the relation $0.8r_1 \leq r_2 \leq r_1$; and (II-4) the distance l between the vertex A and the vertex C and the distance $r_1$ satisfy the relation $0.1r_1 \leq l \leq 0.5r_1$; and (III) each of the subsidiary blades meets the following requirements:

(III-1) the shortest distance $r_3$ between the axis of the rotating shaft and that site of each subsidiary blade which is farthest from the axis of the shaft and the distance $r_1$ satisfy the relation $0.2r_1 \leq r_3 \leq 0.8r_1$; and (III-2) each of the subsidiary blades is located within a range of $\pm 60°$ with respect to a straight line perpendicularly crossing the straight line which passes through the centers of the triangles of the main blades in the horizontal section.

2. The anchor agitator of claim 1 wherein the interior angle $\alpha$ is in the range of from 20° to 40°.

3. The anchor agitator of claim 1 or 2 wherein the internal angle $\beta$ is in the range of 85° to 135°.

* * * * *

UNITED STATES PATENT AND TRADEMARK OFFICE
CERTIFICATE OF CORRECTION

PATENT NO. : 4,366,123
DATED : December 28, 1982
INVENTOR(S) : Akifumi Kato, Nobuhiko Kaneshige, Ryoichi Yamamoto It is certified that error appears in the above—identified patent and that said Letters Patent is hereby corrected as shown below:

Claim 1, section (II), (II-2) should read ---(II-1)---

Claim 1, section (II), (II-4) should read ---the distance $\ell$---

Claim 1, section (II), (II-4) formula should read as follows:

$$---0.1r_1 \leq \ell \leq 0.5r_1---$$

Signed and Sealed this

Twenty-sixth Day of April 1983

[SEAL]

Attest:

GERALD J. MOSSINGHOFF

Attesting Officer

Commissioner of Patents and Trademarks